(12) United States Patent
Lu

(10) Patent No.: US 8,021,114 B2
(45) Date of Patent: Sep. 20, 2011

(54) SELF-ADJUSTING WIND TURBINE GENERATOR BLADE

(76) Inventor: Guixian Lu, Pontiac, MI (US)

( * ) Notice: Subject to any disclaimer, the term of this patent is extended or adjusted under 35 U.S.C. 154(b) by 775 days.

(21) Appl. No.: 12/156,927

(22) Filed: Jun. 6, 2008

(65) Prior Publication Data
US 2009/0304508 A1 Dec. 10, 2009

(51) Int. Cl.
*B63H 1/06* (2006.01)

(52) U.S. Cl. ......... 416/131; 416/87; 416/88; 416/132 R; 416/132 B; 416/226

(58) Field of Classification Search .......... 416/87, 416/88, 131, 132 B, 132 R, 226
See application file for complete search history.

(56) References Cited

U.S. PATENT DOCUMENTS

| 3,249,160 A * | 5/1966 | Messerschmitt ............ 416/174 |
| 6,752,595 B2 * | 6/2004 | Murakami .................... 416/87 |
| 2003/0223868 A1 * | 12/2003 | Dawson et al. ................ 416/1 |

* cited by examiner

*Primary Examiner* — Angel Roman (57) ABSTRACT

A self-adjusting blade for wind turbine generator or windmill will change width of blades according to wind speed to optimize efficiency. The windmill comprises a brace, rib tubes, cylinders, cylinder holders, hose holders, non-movable shells, and movable shells. The movable shells and rib tubes are organized like extendable antennas of portable radios. The movable shells are moved and held by cylinders. There are sets of hose holder for hoses and wires for cylinders. A microcontroller controls cylinders to move the movable shells according wind speed.

14 Claims, 9 Drawing Sheets

A cross section cut at plane a-a

Fig. 8

A cross section cut at plane d-d

A cross section cut at plane c-c

Fig.11

A cross section cut at plane b-b

Fig.12

A cross section cut at plane e-e

SELF-ADJUSTING WIND TURBINE GENERATOR BLADE

BACKGROUND OF INVENTION

Present large wind turbine generator blades are designed slim to protect blades against maximum wind speed. However, most of the times, wind speed is not maximal. Present equipments fail to collect as much wind energy as they supposedly to collect with wider blades.
Prior art: Holland, Jr. (U.S. Pat. No. 4,582,013) "Self-adjusting wind power machine".

OBJECTS OF THE INVENTION

The object of the present invention is to improve the efficiency of wind turbine generators or windmills, especially large ones, by increasing blade width when wind speed decreases. Another object is to protect blades by decreasing blade width when wind speed increases.

BRIEF DESCRIPTION OF THE DRAWING

FIG. 1 shows a blade before extension. 31 and 39 are movable shells of stage three. 110 is non-movable shell. 0 is horizontal axle, around which blades are turning.

FIG. 5 shows the structure inside the blade surface. 1 is the brace. 2 is a rib tube. 14 is a cylinder for movable shell 11 of stage one. 4 is a cylinder holder. 5 is a cylinder holder. 6 is a rib tube. 7 is a cylinders. 8 is a cylinder holder. 9 is a cylinder holder. 109 is a hose holder secured to the brace. 2, 14, 4, 5, 6, 7, 8, 9, and 109 belong to the top section. 99 is a torque sensor. 100 is a micro-controller. 200 is a hydraulic pump.

FIG. 8 is a cross section at rib tube 2, cut at plane a-a on FIG. 1 and FIG. 5. It can be seen the blade surface of top section is formed by non-movable shell 110, movable shell 11 of stage one, movable shell 21 of stage two, movable shell 31 of stage three, movable shell 19 of stage one, movable shell 29 of stage two, and movable shell 39 of stage three. Rib tubes 2, 12, 22, and 32 form a set of rib tube. 32 is a rib tube (a pipe with a hole of zero diameter) secured to the movable shell 31. Rib tube 32 goes into the hole of rib tube 22. The right end of rib tube 22 is secured to movable shell 21. Rib tube 22 goes into the hole of rib tube 12. The right end of rib tube 12 is secured to movable shell 11. Rib tube 12 goes into the hole of the rib tube 2. Rib tube 2 is secured to brace 1. 201, 202, and 203 are position sensors for movable shells 11, 21, and 31 respectively.

FIG. 10 is a cross section at cylinder holder 4, cut at plane c-c on FIG. 1 and FIG. 5. Cylinder 24 is secured to movable shell 11. Cylinder 24 goes into the cylinder holder 4. Cylinder holder 4 is secured to the brace 1. The right end of rod 20 is secured to movable shell 21. There is a hole 102 going through the rod 20 and piston 70 as a path for compressed liquid. 92 is the entrance of the path. 70 is the piston. 95 is an entrance for compressed liquid going to the right side of the piston.

FIG. 11 is a cross section at cylinder 14, cut at plane b-b on FIG. 1 and FIG. 5. Cylinder 14 is secured to brace 1. 10 is the rod of the cylinder 14. The right end of the rod 10 is secured to the movable shell 1. 101 is a hole going through rod 10 and piston 60 as a path of compressed liquid 91 is the entrance of the path. 60 is the piston of the cylinder 14. 96 is an entrance for compressed liquid going to the right side of the piston.

FIG. 12 is a cross section at a set of hose holders, cut at plane e-e on FIG. 1. 141 is a coil spring. The right end of coil spring 141 is secured to movable shell 31. The left end of coil spring 141 is secured to brace 1. 140 is a bunch of hoses and wires. 109, 131, 121, and 111 are hose holders. 109 is secured to the brace 1. 131 is secured to movable shell 31. 121 is secured to movable shell 21. 111 is secured to movable shell 11.=>

DETAILED DESCRIPTION

There are three stages of movable shells in this embodiment There are eight sections of the blade from top down. It can be seen in FIG. 1 to FIG. 5 that there are eight groups of similar structures of each section. Here only the top section is explained. Structure of left side of a section is similar to structure of right side of the section. Only the structure of right side of the top section is explained.

Figure 1:
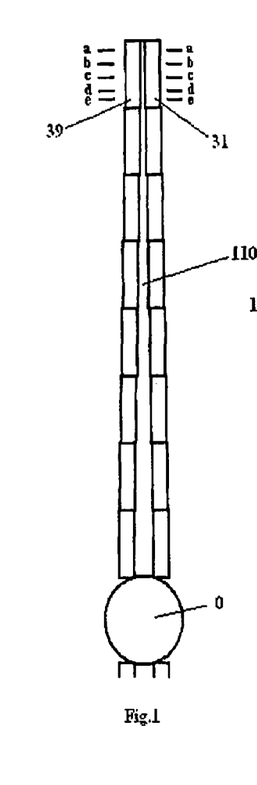
Figure 2:
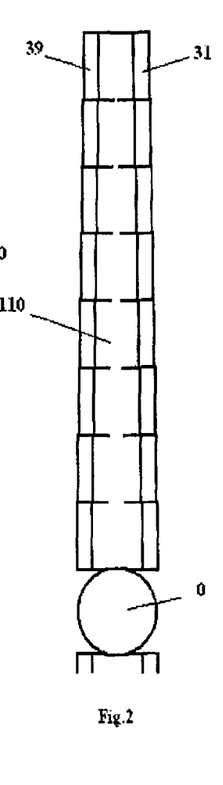
FIG. 2 shows the blade when stage one has extended.
Figure 3:
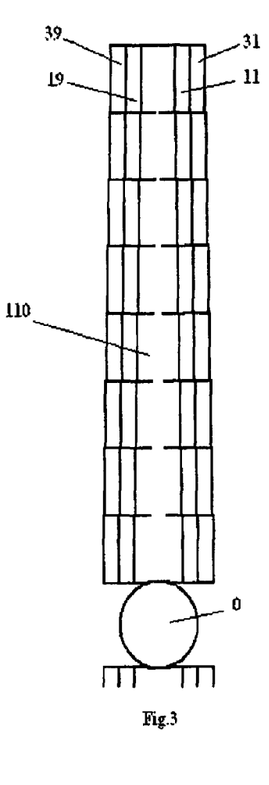
FIG. 3 shows the blade when stage one and stage two have extended. 11 and 19 are movable shells of stage one.
Figure 4:
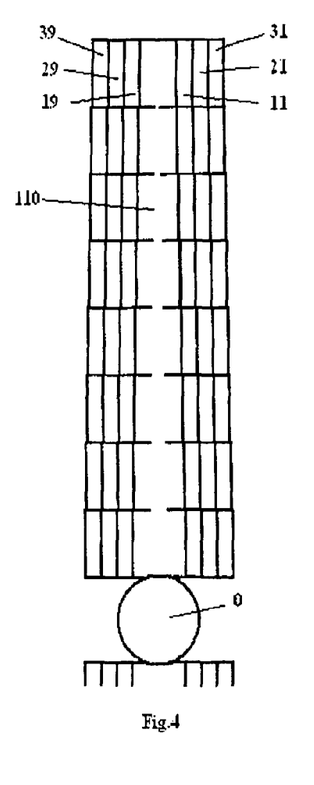
FIG. 4 shows the blade when three stages have extended. 21 and 29 are movable shells of stage two.
Figure 5:
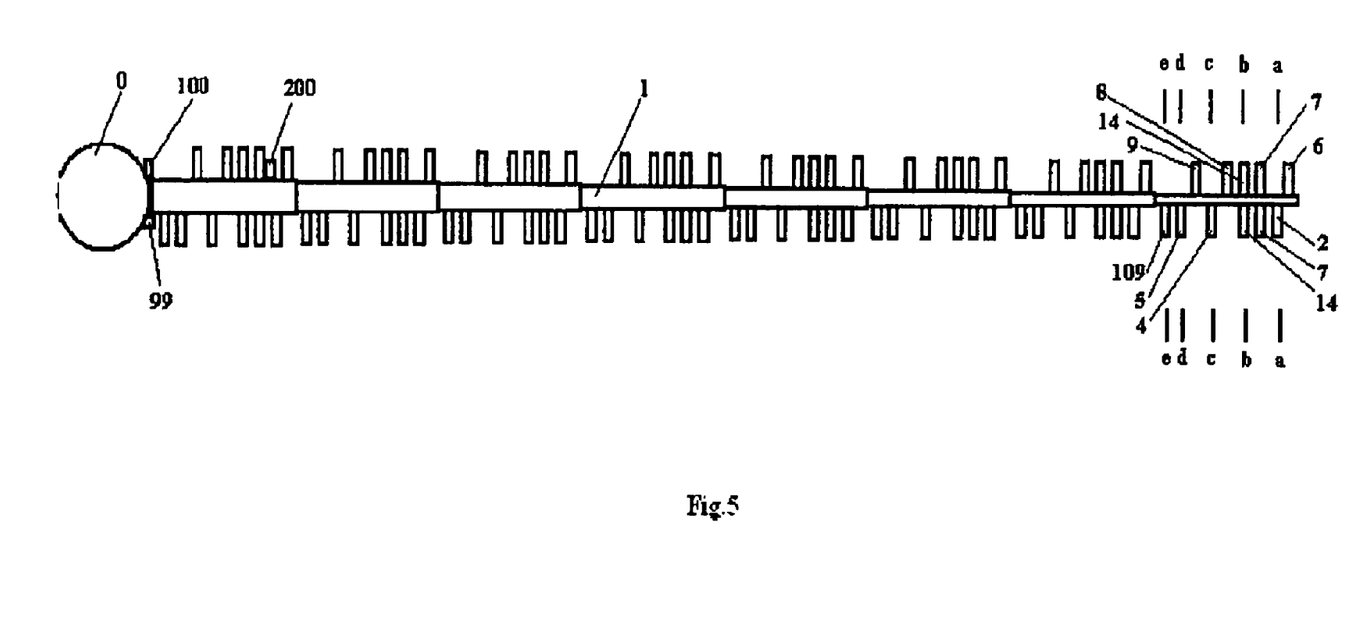
Figure 6:
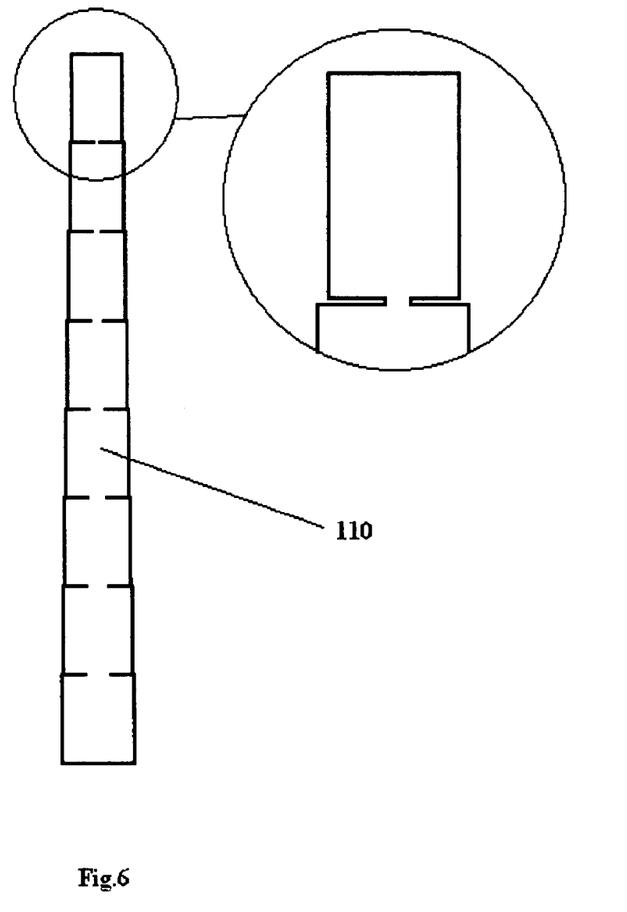
FIG. 6 shows the non-movable shell 10 with a magnified top portion.
Figure 7:
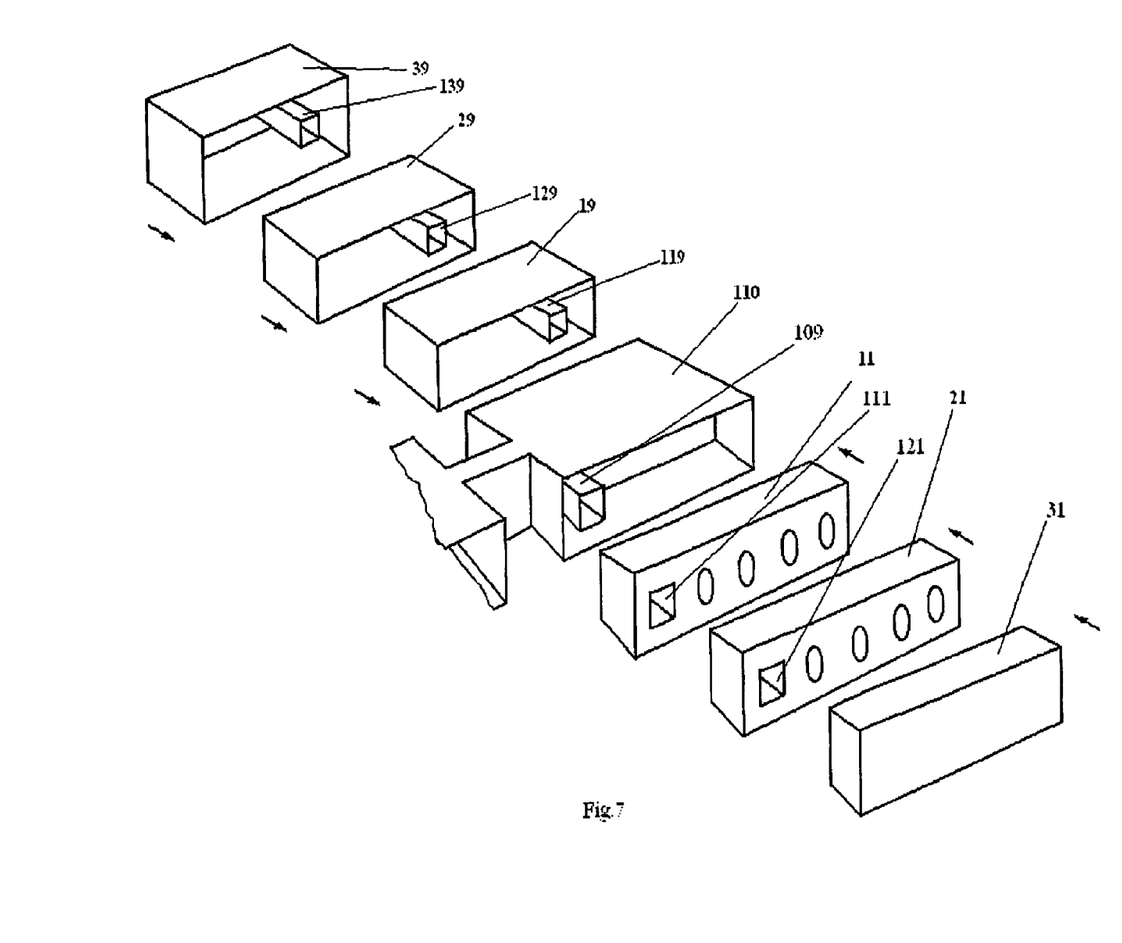
FIG. 7 show the top portion of the non-movable shell 110 and movable shells 31, 21, 11, 39, 29, and 19. The arrows show the directions where each movable shell should go when the blade is assembled. 109, 111, 121, 119, 129, and 139 are hose holders.
Figure 8:
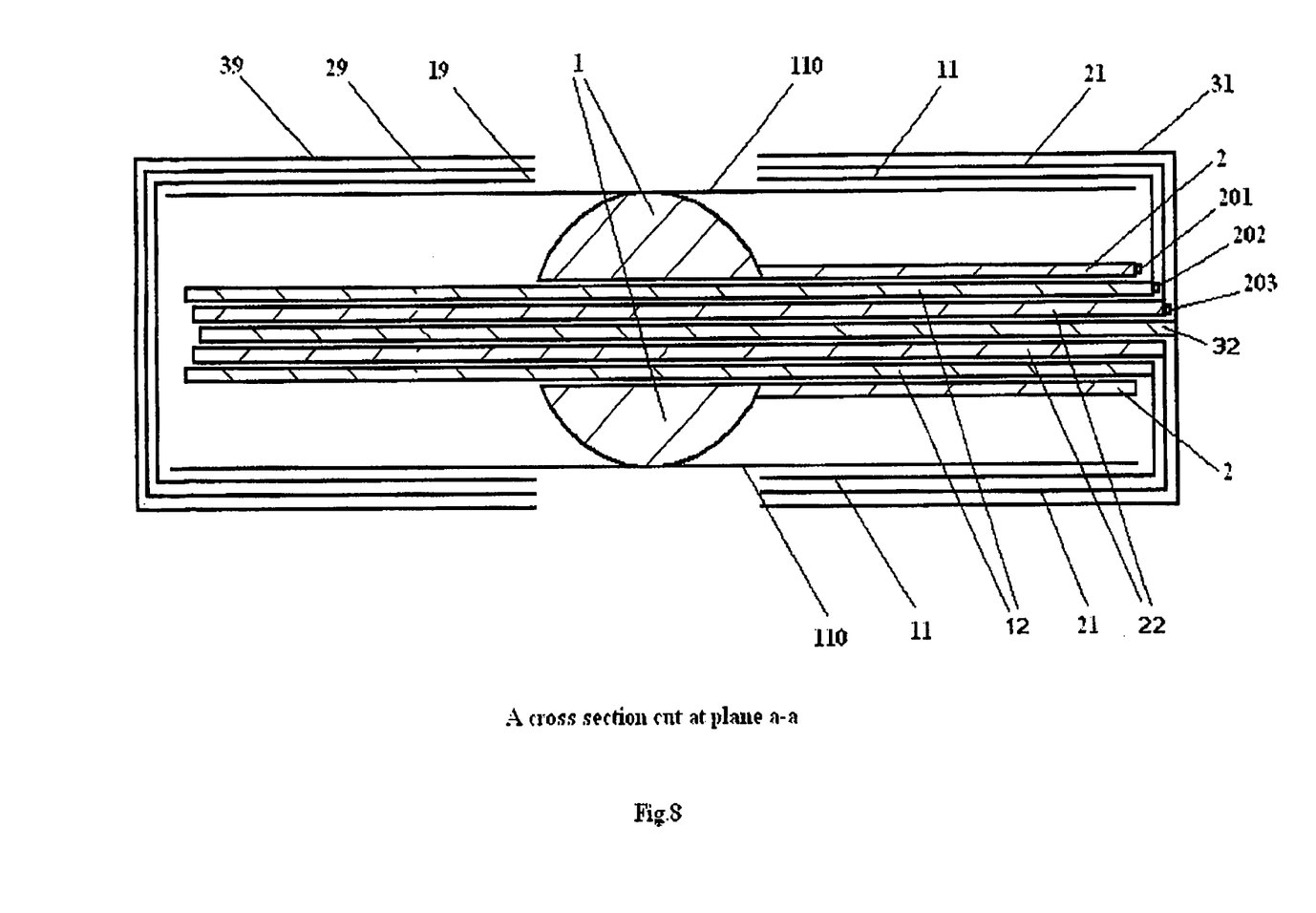
Figure 9:
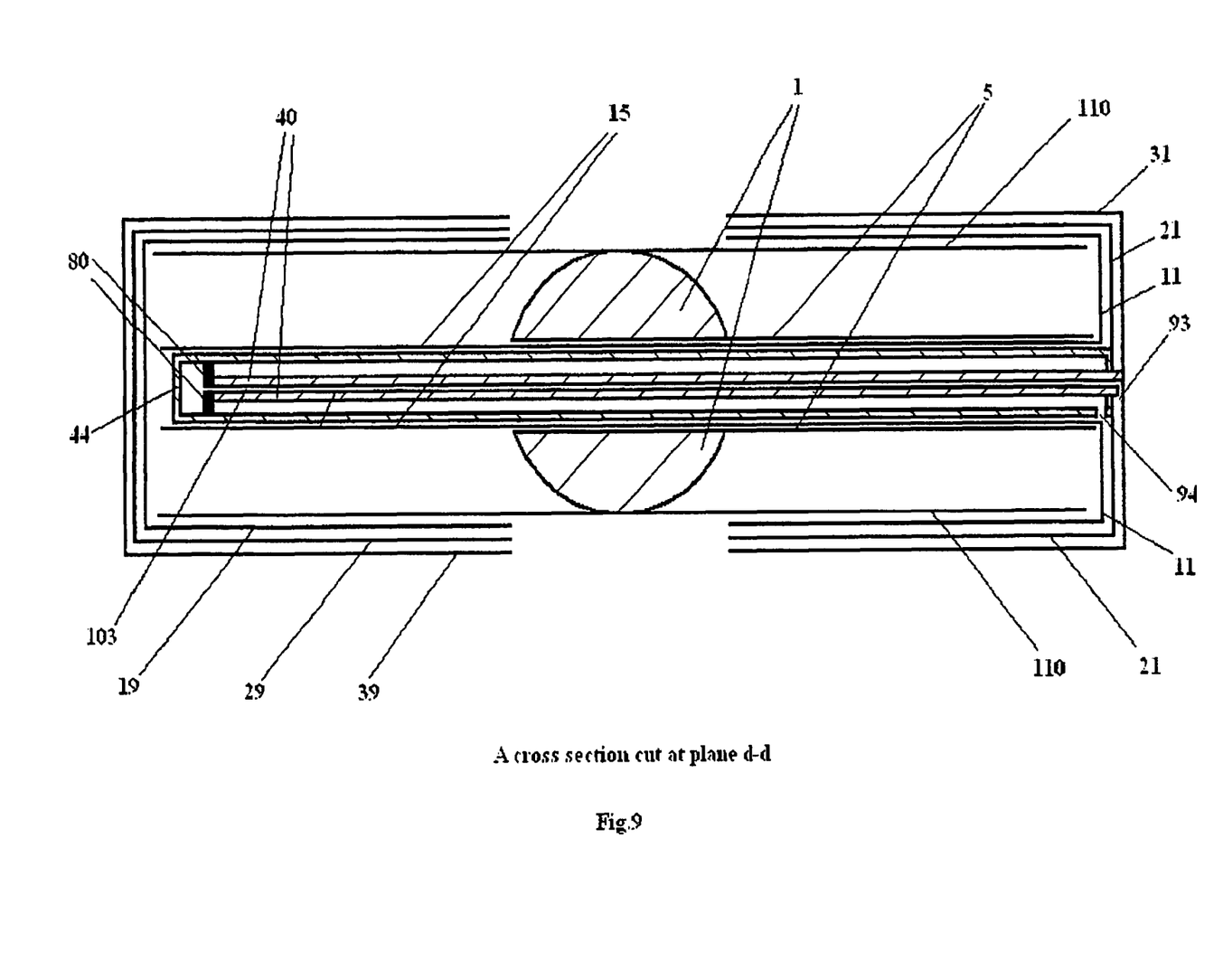
FIG. 9 is a cross section at cylinder holder 5, cut at plane d-d on FIG. 1 and FIG. 5. Cylinder 44 is secured to movable shell 21. Cylinder 44 goes into cylinder holder 15. The cylinder holder 15 goes into the cylinder holder 5. The right end of cylinder holder 15 is secured to movable shell 11. 15 and 5 are one set of cylinder holder. The cylinder holder 5 is secured to brace 1. The right end of rod 40 is secured to movable shell 31. There is a hole 103 going through rod 40 and piston 80 as a path for compressed liquid. 93 is an entrance for the path. 80 is the piston of the cylinder 44. 94 is an entrance for compressed liquid going to the right side of the piston.
Figure 10:
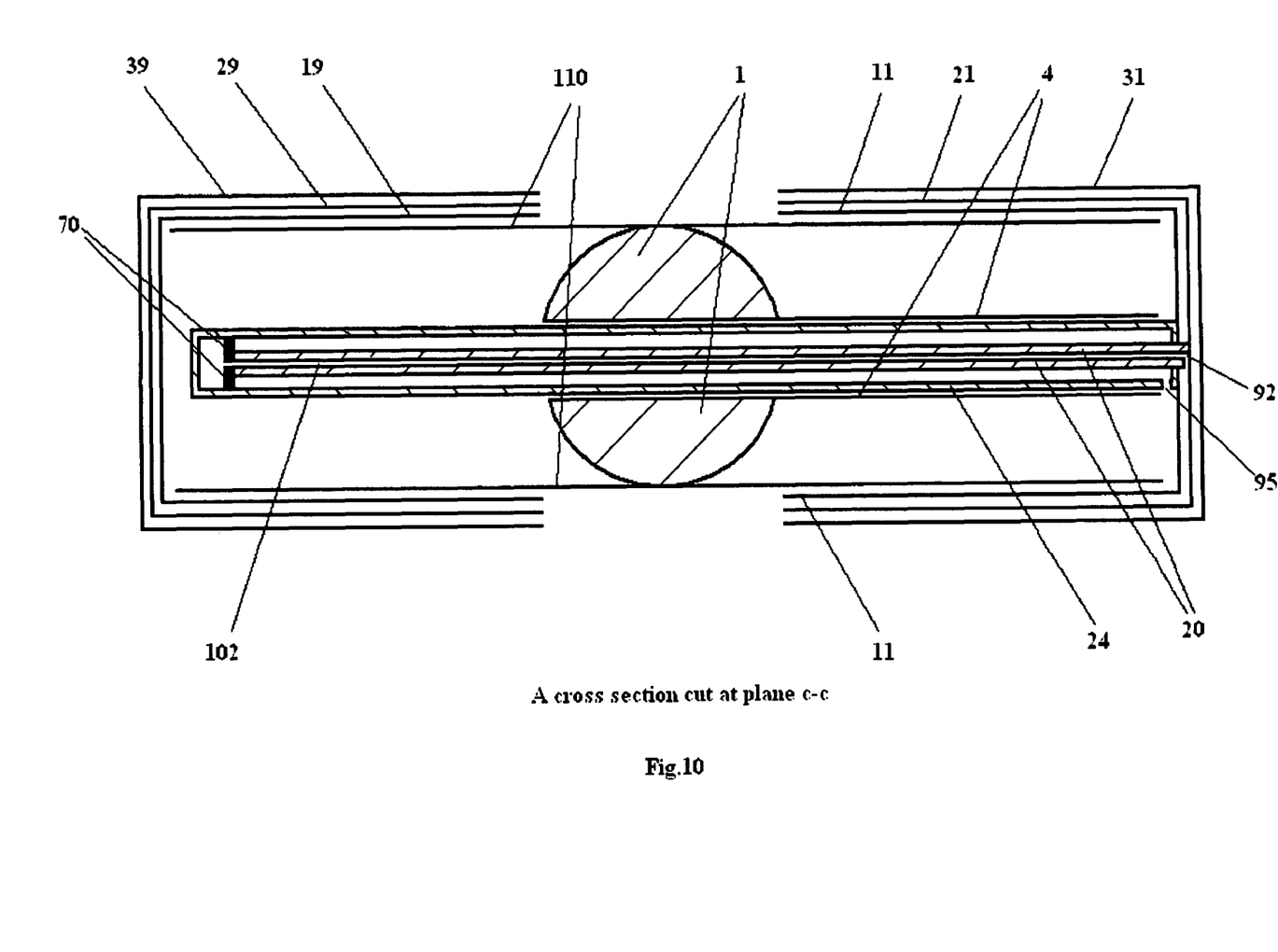
Figure 11:
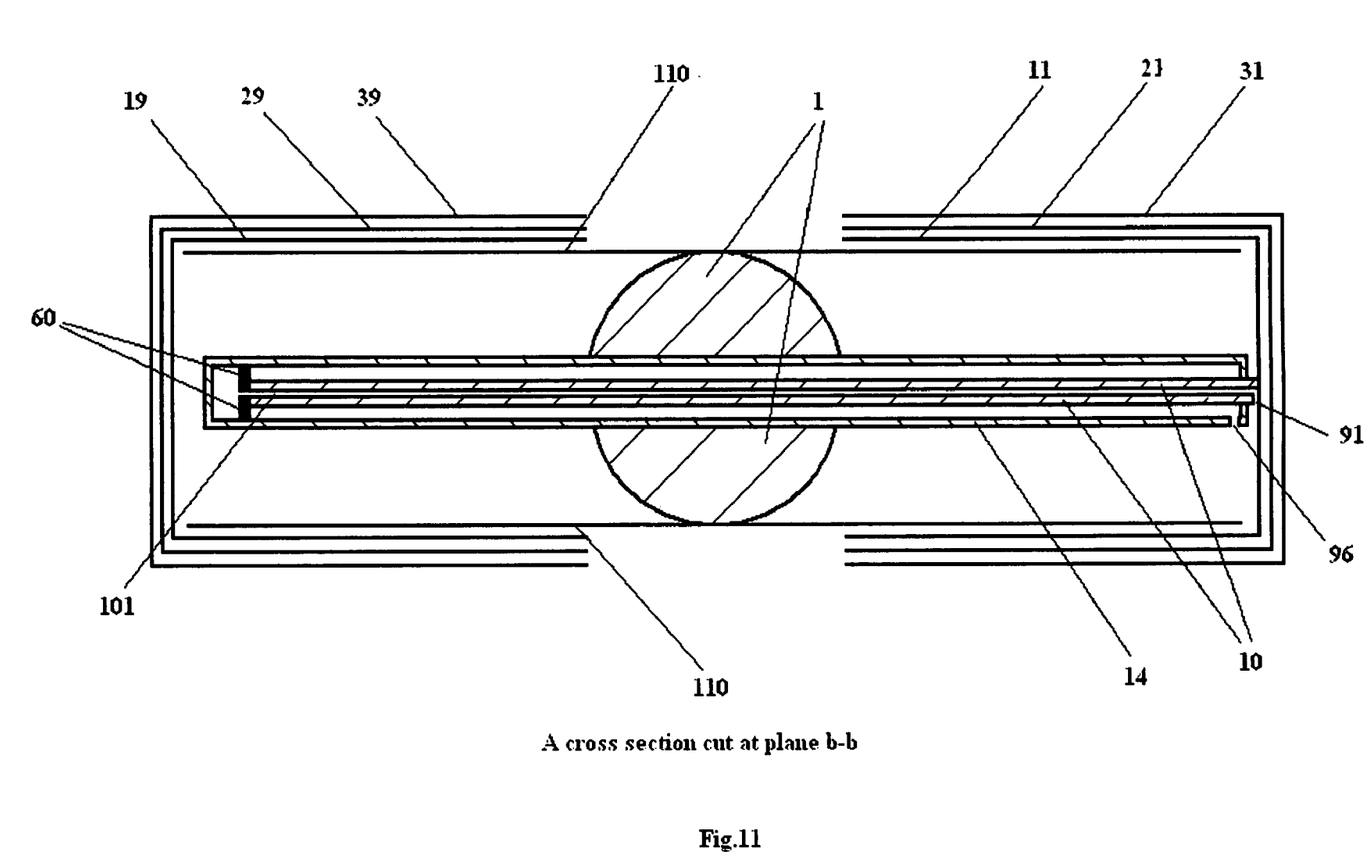
Figure 12:
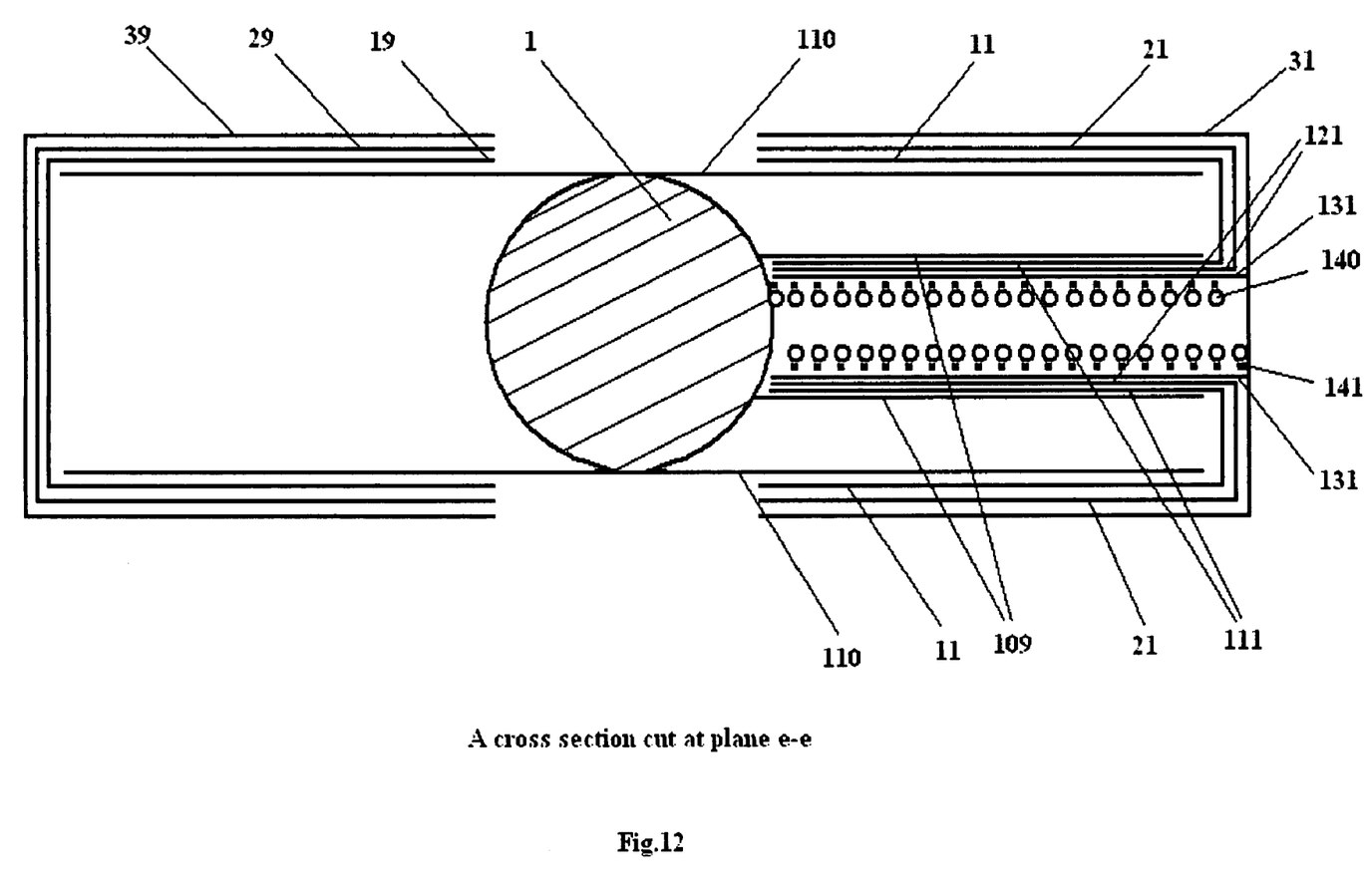

There is a brace for support of the blade. There are many sets of rib tubes to support the shells. Any long things with a cavity from one end all the way to the other end, for example square tubes and a pipe, are considered as tubes. In a set of rib tubes, one rib tube goes into the other rib tube of previous stage (a rib tube closer to the brace), like an extendable antenna for a potable radio. Sets of rib tube are extendable. Sets of rib tube support movable shells against wind torque so that movable shells will not be bent. Each rib tube is secured to a movable shell (see FIG. 8). The shape of a movable shell is like a container with one open side. In this embodiment the shape is like square bucket (see movable shells in FIG. 7). When the blade is compressed, a movable shell goes into another movable shell of next stage. A set of movable shell can have a compressed form, like containers in shipping. When a movable shell extends, it leaves the movable shells inside of it. When a movable shell extends, the rib tube that secured to the movable shell slides half way out of another rib tube. When stage one extends, movable shell 11 moves to the right, while non-movable shell 110 stays. And rib tube 12 slides half way out of rib tube 2. When stage two extends, movable shell 21 leaves shell 11 that was inside of it. And rib tube 22 slides half way out of rib tube 12. When stage three extends, movable shell 31 slides to the right, while movable shell 21 stays. And rib tube 32 slides half way out of rib tube 22. When a blade extends one stage, the rib tube for the stage slides only about half way out of other rib tube of previous stage so that the rib tube can get support from the previous stage against wind torque. There are some position sensors to measure actual position of each movable shell relative to the shell of previous stage, or to the non-movable shell if there is no previous stage. The position sensors may be magnetic sensors. Some magnets will be embedded along a rib tube so that the position sensors can detect them. The result data of measurement will be a feedback to the micro-controller. The position control is closed-loop. Means for moving movable shells is cylinders. Each movable shell is moved by at least one cylinder. In FIG. 9, it can be seen that rob 40 of cylinder 44 will move shell 31 to the right, away from movable shell 21, when stage three extends. Cylinder 44 will pull the movable shell 31 back when the blade compresses. It can be seen that cylinders are long. The far right position of the piston 80 is near the center of cylinder holder 15 so that the rod 40 with piston 80 can also provide some resistance to wind torque. When a movable shell has been moved to a required position, all the valves for the cylinder will be closed to keep the movable shell in the position. It can be seen in FIG. 10, cylinder 24 will move movable shell 21 away from movable shell 11 by rod 20. Cylinder 24 can pull movable shell 21 back to movable shell 11. In FIG. 11, it can be seen that cylinder 14 is responsible for pushing and pulling movable shell 11 back and forth. A real blade can have as many stages of movable shell as long as the blade is stable. A blade can have as many sections of movable shell as they are needed. Each movable shell can have as many sets of rib tube and cylinders as it needs them. Each movable shell has a set of hose holder.=> Look at FIG. 12. There is a hose in the bunch 140 comes from the hydraulic pump 200 to the entrance 93. The shape of hose holder is like a square tube or pipe. The hose holders limit the path for the coil spring going from the brace to movable shell 31. The coil spring m the hoses and wires extend evenly in the space inside the extending set of hose holder. The coil spring makes sure that the hoses and wires compress evenly into the smaller space inside the compressing set of hose holder. The coil spring also protects the hoses and wires from wearing out by the inner surface of hose holders. Movable shells 21 and 11 have their own sets of hose holder (not shown). The hose holder set for movable shell 21 holds two hoses. One of the hoses goes to entrance 92 of cylinder 24. The other goes to entrance 94 of cylinder 44. The hose holder set for movable shell 11 holds two hoses. One of the hoses goes from pump 200 to entrance 91 of cylinder 14. The other of the hoses goes from pump 200 to entrance 95 of cylinder 24. There is a hose corning from pump 200 to entrance 96. This hose does not go through any hose holder. A microprocessor in the microcontroller calculates the best blade size and the best positions of each shell. A microprocessor receives data from the position sensors and data of wind speed and torque at critical spots. The micro-controller controls the cylinders by valves to change the position of movable shells. One micro controller controls all blades for a wind turbine generator and makes sure the wind turbine generator is balanced. The microcontroller has a radio that can communicate with a radio on the ground. The radio on the ground sends commands that can override the commands from the microprocessor. In case the microprocessor malfunctions, the radio on the ground will directly control the valves and move the movable shells.

The invention claimed is:

1. A self-adjusting blade for wind turbine generator or windmill comprising a brace, sets of rib tube, a surface covered by sets of movable shell and non-movable shells, sets of cylinder holder, cylinders that move and hold said movable shells, sets of hose holder, position sensors, torque sensors, and a micro-controller with a microprocessor and a radio.

2. In claim 1, wherein each of said sets of movable shell consists of different stages of movable shells, each of said movable shells has a shape of open container, each of said movable shells goes into another said movable shell of one stage up when said blade compresses.

3. In claim 1, wherein each of said movable shells has a position senor to measure it's position relative to another movable shell of previous stage or relative to said non-movable shells.

4. In claim 1, wherein each of said sets of rib tube consists of a number of rib tubes, each of said rib tubes goes into another rib tube, when said blade compresses, and each of said rid tubes is secured to one of said movable shells.

5. In claim 1, wherein each of said movable shells is supported by at least one of said sets of rib tube.

6. In claim 1, wherein each of said movable shells is moved and held by at least one of said cylinders.

7. In claim 1, wherein each of said cylinders has one of said sets of cylinder holder for support.

8. In claim 1, wherein each of said cylinder holders is either secured to said brace or going into another cylinder holder to provide resistance against wind torque.

9. In claim 1, wherein there is a hole going through the rod and piston of each of said cylinders as a path of compressed liquid for cylinder.

10. In claim 1, wherein said micro-controller calculates a destination position of each of said movable shells and controls said cylinders by valves to move each of said movable shells to the destination position and holds said movable shell in the position.

11. In claim 1, wherein each of said position sensors measures a actual position of one of said movable shells and reports the data to said micro-controller.

12. In claim 1, wherein said torque sensors are at critical spots measuring torque and reporting data to said microprocessor.

13. In claim 1, wherein each of said movable shells has at least one of said sets of hose holder with a coil spring for hoses and wires, each of said sets of hose holder consists of hose holders, each of said hose holder is secured to one of said movable shells or said brace, each of said hose holders, except the hose holder secured to said brace, goes into another hose holder, when said blade compresses.

14. In claim 1, wherein said radio communicates with a ground radio.

* * * * *